United States Patent Office 3,470,915
Patented Oct. 7, 1969

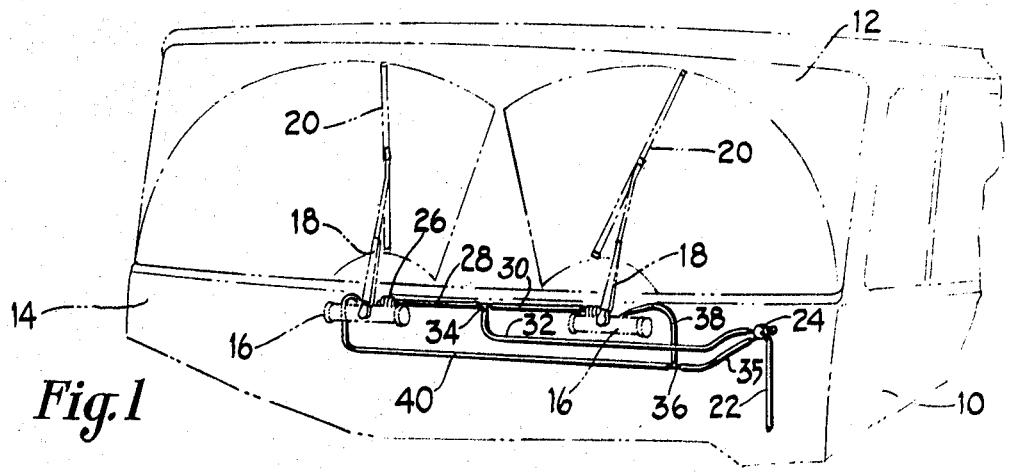

3,470,915
SPEED REGULATING VALVE ASSEMBLY
Martin Bitzer, Kenmore, and Raymond A. Deibel, Cheektowaga, N.Y., assignors to Trico Products Corporation, Buffalo, N.Y.
Filed Dec. 14, 1966, Ser. No. 601,636
Int. Cl. F16k 21/02; F15d 1/02
U.S. Cl. 138—43            7 Claims

ABSTRACT OF THE DISCLOSURE

A windshield wiper apparatus on a motor vehicle having a reciprocating fluid pressure motor for driving a windshield wiper arm to and fro. An adjustable speed regulating valve assembly in the fluid supplying conduit of the motor includes a pair of opposed valve seats having grooved surfaces forming fluid carrying passages which are spaced apart by a resilient valve which can be compressed to vary the effective cross sectional area of the passages.

Background of the invention

The invention relates to an adjustable speed regulating valve for controlling flow velocity in fluid pressure systems and, more particularly, a regulating valve for fluid pressure systems including fluid motors as, for example, fluid pressure windshield wiper motors for motor vehicles. Adjustable needle valves have been used for regulating flow velocity in fluid pressure systems. Needle valves result in very small restrictions which readily collect foreign particles and become clogged. A long constriction of greater cross sectional area can produce the same flow velocity as the shorter needle valve constriction and overcome the clogging problem. However, the problem of adjustment is introduced in a long regulating constriction.

Where two or more fluid operated motors are utilized in a single system, different lengths of supply conduit may be used, thus requiring separate adjustment of a speed regulating valve at each motor to equalize and synchronize operation of the motors.

Although manual speed control valves may be provided for varying the speed of the motor during operation, a speed regulating valve is desirable to limit the speed range of the motor and particularly the maximum velocity. Such limitation is essential to prevent damage to motor components and to provide optimum operating speeds. This is particularly essential when more than one fluid system is supplied from a single fluid pressure source. Thus, it is apparent that an adjustable, clog-free regulating valve is advantageous in fluid pressure systems.

Summary

The principal object of the invention is to provide an improved adjustable speed regulating valve which is simple, economical and clog-free.

Another object of the invention is to provide an improved adjustable speed regulating valve which provides a restriction of substantial length in a limited space.

Other objects and advantages of the invention will be aparent from the detailed description taken in connection with the accompanying drawings.

The above objects are attained by a unique regulating valve assembly which comprises a pair of valve body sections threaded together. A compressible valve element is disposed between the opposing faces of the body sections. A central port in each valve section terminates at a grooved surface, forming a valve seat in which the grooves form passages which communicate with the outer periphery of the valve seat. The valve seats are disposed in opposition and are spaced apart by a compressible valve element. The grooves may be spiral, radial grooves or other suitable passages. By varying the compressive force on the valve element between the valve seats in response to rotation of the threaded connection between the valve body sections, the effective cross section of the passages formed by the grooves and the surface of the valve element adjacent thereto is varied.

The regulating valve of this invention is shown and described by way of example embodied in a windshield wiper cleaning system which includes a pair of fluid pressure wiper motors supplied from a source of fluid pressure through the manual on-off speed control valve. The manual on-off speed control valve controls the velocity of the motors within the range permitted by the speed regulating valve. Conduits conduct the fluid pressure from the manual control valve to the motor. At the motor housing is a reciprocating valve chamber which permits pressure to one side or the other of the motor piston chamber, thus setting up reciprocating wiper motion. The regulating valve assembly is placed adjacent to the valve chamber of the motor and connected to the incoming pressure line. It limits the range of speed obtained by manipulation of the manual control.

The grooves on the valve seats of the regulating valve assembly form elongated restricted passages in a small space. The passages because of their length may be large enough in cross sectional area to avoid clogging by small foreign particles in the fluid stream. The cross sectional area of the passages is adjustable and the passages occupy a small amount of space.

Drawings

FIG. 1 is a partial perspective view of a motor vehicle having a fluid pressure windshield wiper system embodying this invention;

FIG. 2 is a side elevational view of the regulating valve partially exploded and partially in section;

FIG. 3 is a view taken along line III—III of FIG. 2;

FIG. 4 is a cut away side elevational assembly view showing a modified form of the adjustable regulating valve assembly; and FIG. 5 is an end view of a modified valve seat as in FIG. 4.

Description of the preferred embodiments

Referring now to FIG. 1, there is shown in phantom a partial outline of a motor vehicle 10 which includes a windshield panel 12 mounted in a front section 14 of vehicle 10. A pair of windshield wiper motors 16 are shown mounted in front section 14. These wiper motors are of the reciprocal piston type and operate on fluid pressure from any suitable source (not shown) within the vehicle as, for example, an air compressor or compressed air storage tank. A pair of windshield wiper arms 18 are attached to wiper motors 16 in a conventional manner and carry wiper blades 20 across the windshield to clean the glass 12.

A supply conduit 22 carries air pressure from a source such as a pump to a manual rotary control valve 24 of similar construction to the valve described in Patent No. 3,076,220 by Martin Bitzer, issued Feb. 5, 1963.

The manual control 24 has an "off" or neutral position, a "run" position and a parking position. In the "run" position the valve can be rotated to vary the speed of the motors within limits of the speed range at which the adjustable regulating valve 26 is set. The manual control 24 is moved to the park position momentarily to cause the wipers to move to a position out of the wiping pattern. It then automatically moves to the "off" or neutral position.

The speed regulating valve assemblies 26 are installed in the inlet ports of motors 16. Conduits 28 and 30 are attached to regulator valves 26 and connected to common pressure line 32 by T connection 34. Pressure line 32 is connected to the run side of the manual rotary control valve 24. Line 35 runs from the park connection on the rotary control 24 to a T connection 36 and then through lines 38 and 40 to the parking side of each of motors 16.

Thus, to briefly describe the use of regulating valve 26 in conjunction with a windshield cleaning system and as illustrated in FIG. 1, we would turn the rotary control valve 24 to the positioned marked "run." Air pressure from source line 22 would be conducted through control 24 to line 32 to T 34 and thence through lines 28 and 30 to regulating valves 26 attached to run side of wiper motors 16. To "park" motors, control 24 is turned to position marked "park." Air pressure source line 22 conducts air pressure through control 24 to line 35 to T connection 36 and thus to lines 38 and 40 to the park side of motors 16. When motors 16 are parked, control 24 is released and returns to a neutral position as described in Patent No. 3,076,220.

Referring now to FIG. 2, there is shown one preferred embodiment of regulating valve assembly 26 partially in section and exploded to show the construction of the valve unit. The valve 26 comprises a valve body having an inlet body section 42 and an outlet body section 60. Valve seat 44 on the inboard side of inlet body section 42 has thereon a continuous groove 46 of spiral configuration forming a fluid passage starting at inlet port 48 and running to the outer periphery 50 as shown in FIG. 3. The outboard end of body 42 has a surface of barbed configuration 52 designed to receive and hold a hose 28 in a firm connection. Hose 28 conducts air pressure to inlet port 48. Body 42 has a threaded portion 54 and a boss 56 with flat areas 58 to receive a suitable tool or wrench. Outlet body section 60 has within its cavity 62 a continuous groove 64 of spiral configuration on valve face 66 forming a fluid passage. This spiral starts at the outer periphery of valve seat 68 and runs inwardly to central outlet port 70. Body section 60 has an internal threaded portion 72 which receives and matches threaded portion 54. A valve 74 made of a compressible rubber-like material is placed between valve faces 44 and 66. A threaded end 76 is designed to fit into a matching threaded portion on the motor or other unit utilizing the valve assembly 26. Hex portion 78 provides surface for a wrench to tighten body 60 into the motor. Varying the degree of compression on insert 74 varies the effective cross sectional area of the fluid passages in the valve seats and thus determines the velocity of the fluid. This is accomplished by applying proper wrench or tool to flats 58 of inlet body section 42. Hex nut 80 is located on threaded portion 54 and is used as a locking nut when inlet section 42 and outlet section 60 have been assembled.

In operation the fluid stream under pressure flows through inlet port 48, thence through the passage formed by valve 74 and spiral groove 46 to the periphery of valve seat 44, thence through the peripheral clearance between valve 74 and cavity 62. The fluid enters the passage formed by valve 74 and spiral groove 64 flowing from the periphery of valve seat 68 to the central outlet port 70.

To adjust the cross sectional area of the passage formed by the spiral grooves 46, 64 and valve element 74, the valve body sections are rotated to compress the valve element 44 so that more or less of the compressible valve 74 extends into the grooves 46, 64.

FIG. 4 illustrates a preferred modification of the invention. In the example illustrated, valve seat elements 82 and 84 are separate replaceable units which are received in the cavity of valve body section 60'. In order to accommodate different installations, body section 42' not only has its threaded section 54' to mate with threaded section 72' of body section 60', but carries an internal threaded portion 87 at its inlet end to accommodate various type hose connections, elbows and/or tube connections which might be required in a particular fluid system. Inlet body section 42' has an inlet port 48'. Outlet body section 60' has an outlet port 70'. Valve 74' of resilient compressible material lies between valve sections 82 and 84 in cavity 62' and is compressed therebetween by threading body section 42' into body section 60' thereby varying the effective cross sectional area of the passages. Nut 80' provides a means of clamping the two body sections 42' and 60' together. Threaded portion 76' provides a means of attaching valve unit 26' to a motor or other unit utilizing the valve. In this embodiment, valve seat element 82 has a valve face 44' and a continuous groove of spiral configuration 46' such as is shown in FIG. 3. Valve seat element 84 is made with two cross slots 86 and 88 in its valve seat face 66', both slots being at 90° angles to each other and running across the valve seat face 66' intersecting each other at the center portion of valve seat element 84 at 70' which is the outlet port. An O ring type seal 90 is installed as shown between valve body section 42' and the abutting surface on valve seat element 82. This is to prevent any internal leakage around valve body threaded portions 54' and 72'.

The flow through speed regulating valve of FIG. 4 is from inlet port 48' to outlet port 70' through passages formed by spiral groove 46' and valve element 74' to the outer periphery of valve seat 82 and thence through the peripheral clearance of valve element 74' and radially inward through slots 86 and 88 of valve seat 84 to outlet port 70'.

It will of course be understood that fluid flow through both the modification of FIG 2 and the modification of FIG. 4 is reversible and that the inlet ports and outlet ports are so designated for convenience in description.

The combination of valve elements 82 and 84 as described in FIG. 4 increase the flow or volume of fluid pressure passing through valve 26' as compared with the fluid flow through valve 26 where each of the valve faces 44 and 66 carry grooves of spiral configuration. It should be obvious, therefore, in accordance with the broader aspects of the invention, that different combinations of the valve faces disclosed in FIG. 2 and FIG. 4 could provide various degrees of control over fluid pressure passing through a regulating valve.

Although certain specific embodiments of the invention have been shown and described for the purpose of illustration, it will of course be understood that in its broadest aspects other modifications and embodiments may be made within the scope of the invention. For example, the invention need not be limited to a windshield wiper system or the operation of a windshield wiper motor, but may be employed for controlling fluid pressure and volume in any number of devices where a controlled fluid flow is required. Thus, it should be understood that the present invention is not limited to the embodiments illustrated and described, but in its broadest aspects it includes all equivalent embodiments and modifications which come within the scope of the invention.

What is claimed is:

1. In a fluid pressure operated windshield wiper system comprising a motor and conduit means for connecting said motor to a source of fluid pressure; an adjustable valve assembly in circuit with said conduit means for controlling a fluid pressure stream, said valve assembly comprising a valve body, a pair of opposed valve seats of rigid material, separate from said valve body disposed for axial movement within said valve body, each of said valve seats having a flow passage formed on a surface thereof, said valve seats being disposed in said valve body with the surfaces provided with said flow passages facing toward each other, a compressible valve element of elastomeric material having uninterrupted surfaces on opposite sides thereof and of smaller cross sectional area than the interior of said valve body, said valve element being disposed intermediate said valve seats in juxtaposition therewith forming a continuous restricted passage through said valve, means for manually adjustably compressing said valve between said valve seats to thereby vary the effective cross sectional area of said continuous restricted passage.

2. An adjustable valve according to claim 1 wherein the valve body includes an inlet section and an outlet section telescopically coupled together for axial adjustment relative to each other.

3. An adjustable valve assembly according to claim 1 wherein the flow passage on at least one of said valve seats is a spiral groove.

4. An adjustable valve assembly according to claim 1 wherein the flow passage on at least one of said valve seats is a radially extending slot.

5. An adjustable valve assembly according to claim 1 wherein the flow passage on one of said valve seats is a spiral and the groove on the other of said valve seats is a radially extending slot.

6. A regulating valve for controlling a fluid pressure stream comprising a valve body including an inlet section and an outlet section telescopically and axially adjustably coupled together, said inlet and outlet sections, respectively, having surfaces disposed in opposition to each other, each of said valve body sections having an axial port, a pair of valve seats of relatively rigid material disposed for axial movement within said valve body; said valve seats each having an axial opening and a groove on a surface thereof, said valve seats being disposed in said valve body with the surfaces provided with said grooves facing toward each other, a valve element of compressible material having uninterrupted valve surfaces on opposite sides thereof and of smaller cross sectional area than the interior of said valve body, said valve seats being spaced apart by said valve element, each valve element surface lying in juxtaposition to one of said valve seat surfaces, said groove extending between said axial opening and the outer periphery of the valve seat surface and conduit means for effecting fluid communication between said inlet section and said outlet section through said grooves to obtain a fluid flow through said regulating valve whereby a controlled flow rate is maintained between the inlet side of said valve and the outlet side of said valve.

7. A regulating valve for controlling a fluid pressure stream comprising a valve body including an inlet section and an outlet section, including cooperating securing means for telescopically securing said sections together for axial adjustment relative to each other, one of said sections having a cavity therein, a pair of valve seat elements of rigid material freely positioned for axial movement within said cavity, said valve seat elements being disposed in said valve body with a surface of one valve seat element facing a surface of the other valve seat element, compressible valve element means of smaller cross sectional area than said cavity disposed intermediate said valve seat elements having a pair of valve faces on opposite sides thereof, each of said valve faces lying in juxtaposition to one of said facing valve seat surfaces, a groove formed in each of said facing valve seat surfaces and conduit means for effecting fluid communication between said inlet means and said outlet means through said grooves whereby axial adjustment of said inlet and outlet sections varies compression force between said valve seat faces and said valve element means to thereby vary the effective cross sectional area of said grooves.

References Cited

UNITED STATES PATENTS

| | | | |
|---|---|---|---|
| 1,899,251 | 2/1933 | Zerk | 138—42 X |
| 1,964,300 | 6/1934 | Perry et al. | 138—43 |
| 1,983,213 | 12/1934 | Brady et al. | 138—43 |
| 1,998,761 | 4/1935 | Hueber et al. | 15—250.12 X |
| 2,236,084 | 3/1941 | Brown | 138—43 |
| 2,511,733 | 6/1950 | Morrison | 138—43 |
| 2,547,175 | 4/1951 | Sacchini | 15—250.13 X |
| 2,574,294 | 11/1951 | Sampson | 15—250.12 |
| 2,680,262 | 6/1954 | Jorgensen | 15—250.12 X |
| 2,813,541 | 11/1957 | Beller | 138—43 X |
| 2,838,072 | 6/1958 | Stumm | 138—43 X |

FOREIGN PATENTS

| | | |
|---|---|---|
| 48,836 | 6/1934 | Denmark. |

ALFRED R. GUEST, Primary Examiner

U.S. Cl. X.R.

15—250.12